April 10, 1956 W. LENNARTZ 2,741,572
REINFORCING AND SUPPORTING MEANS OF PLASTIC MATERIAL
FOR ARTICLES CONSISTING OF THE SAME MATERIAL
Filed Oct. 8, 1953
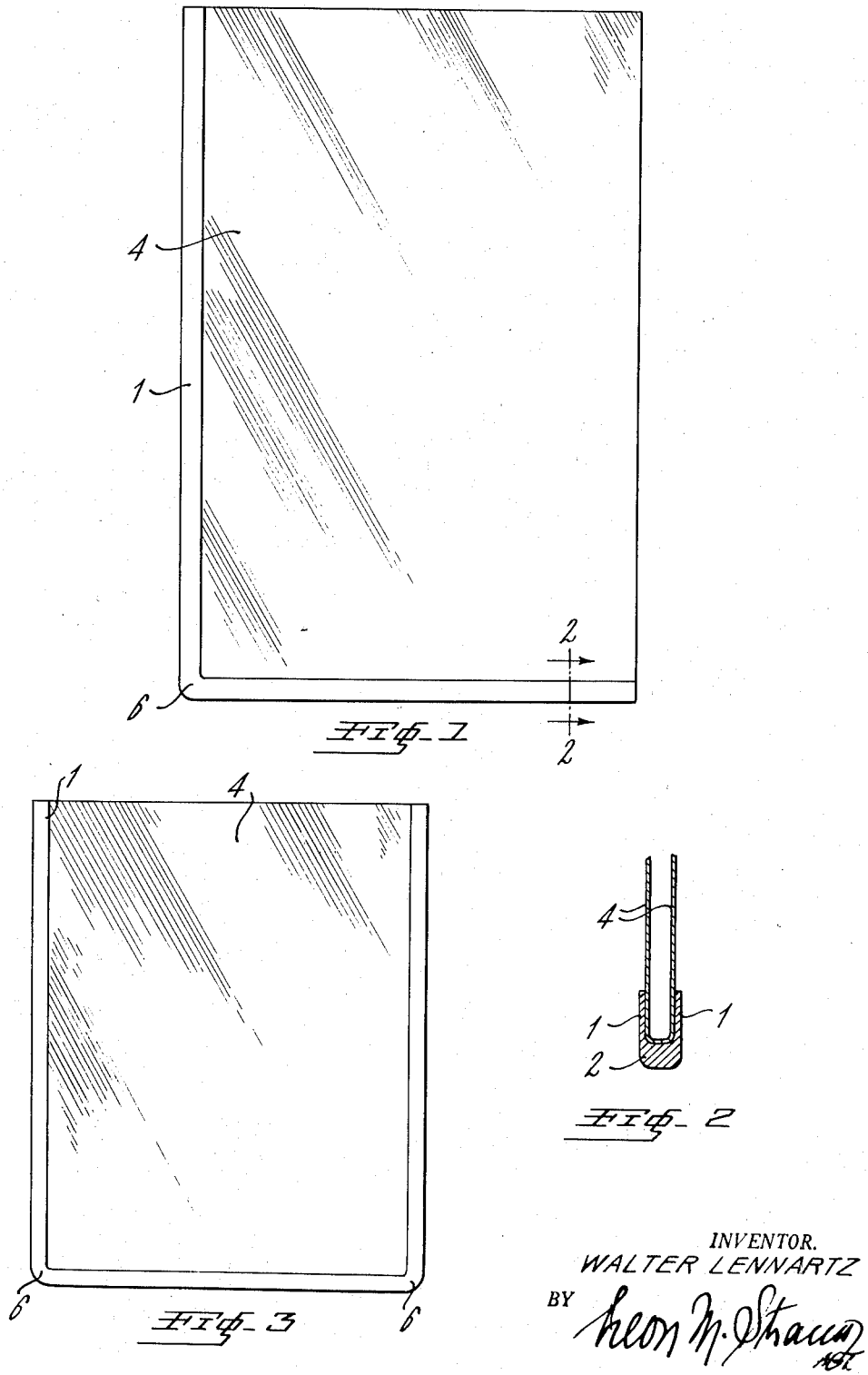
INVENTOR.
WALTER LENNARTZ
BY

United States Patent Office 2,741,572
Patented Apr. 10, 1956

2,741,572

REINFORCING AND SUPPORTING MEANS OF PLASTIC MATERIAL FOR ARTICLES CONSISTING OF THE SAME MATERIAL

Walter Lennartz, Dachau, near Munich, Germany

Application October 8, 1953, Serial No. 386,820

Claims priority, application Germany October 15, 1952

1 Claim. (Cl. 154—43)

The present invention relates to reinforcing and supporting means made of plastic material and suited for being fastened through heat sealing or bonding to the edges of articles produced from the same material, such as the coverings of file records, identity cards etc., or the U-shaped walls of containers, boxes etc.

It is an object of the invention to provide means contributing to the increase of the stability of said articles to thereby prolong the lifetime and to maintain the filling capacity thereof, while simultaneously the elasticity of the articles remains unchanged as far as is necessary.

Another advantage of the invention resides in the moldable nature of the plastic material employed in the manufacture of the reinforcing and supporting means, so that reinforcing and supporting means of this kind can be adapted in shape to all requirements and to various purposes of use for which hitherto plastic material has not been employed.

Additional features and advantages of the invention will be understood from a consideration of the following detailed description taken in connection with the accompanying drawings, forming part of this specification, and in which a preferred embodiment of the invention has been shown by way of illustration. However, I wish to say that the invention is not confined to any strict conformity with the showing of the drawing, but same may be changed or modified, so long as such changes or modifications mark no material departure from the salient features of the invention as expressed in the appended claims.

In the drawing, in which like or identical parts are referred to by the same reference numerals, Fig. 1 is an elevational view of a covering reinforced along two closed up adjoining edges by a continuous reinforcing strip;

Fig. 2 is a fragmentary sectional view (taken along line 2—2 of Fig. 1), showing how the reinforcing strip embraces the bent or folded portion of a plastic sheet from which the covering is manufactured;

Fig. 3 is a view of a covering for an identity card, having its three closed-up edges reinforced by a continuous reinforcing strip.

In the form of invention illustrated in Figs. 1 and 2, the reinforcing means consist of an elongated U-shaped member 1, 2 of plastic material of a type which is suited for heat-sealing, and which may be transparent and clear as glass, or non-transparent and colored, or colorless.

In the embodiment of Fig. 2, the transversely extending portion or cross-piece 2 of the reinforcing member or strip 1, 2 is considerably thicker than the two lateral, substantially parallel legs or flanges 1 of the strip, serving in this way as a general stiffening means for the entire strip, and as a means of securing the lateral legs in proper position to said cross-piece. A strip of this kind is capable of resisting pressure and tear, and is yet elastic to a certain degree. The thickness of said cross-piece is however at least twice the thickness of each leg. The thicker portion 2 of the reinforcing strip prevents tearing off of the two lateral legs of the strip, as well as tearing of the covering sheets 4 at the two ends of the strip. The fastening of the strip 1, 2 to the covering sheets 3 is effected by means of heat-sealing or bonding, which fastening method is well known for articles of plastic material. In some cases—depending upon the particular nature of the material of the reinforcing strip a simple clamping or pressing action suffices to produce the required result.

The inner width between the lateral legs of the strip 1 depends upon the thickness or upon the number of the covering sheets to be employed, and reinforcing strips of this kind may be adapted in shape to any required shape of the covering.

The use of differently colored strips permits a visual differentiation of the coverings, and thus facilitates their manipulation in every day's use.

It is further possible to provide the strip with a smooth or roughened surface, or with a differently profiled transversely extending portion or joint portion 2, for instance through enlargement of the joint portion 2.

Many articles produced from artificial material, especially coverings of the type herein referred to, have the deficiency, resulting from the particular kind of material used in the manufacture, that their capacity of resistance against bending, particularly at the bent portions of the covering, is totally unsatisfactory. The result are deformations at the bent portions, and these deformations are then the cause or the beginning of an early unfitness for use of the entire covering.

It has already been proposed to reinforce coverings of this kind by means of a tape fastened to the coverings through heat-sealing or bonding. But the stiffness of tape is likewise unsatisfactory, and the sharp corners formed by the tape at the coverings cause injuries to the pockets in which the coverings are carried, and also hinder to some extent the convenient handling, and reduce the lifetime of the coverings.

These disadvantages of known coverings are likewise overcome by the invention, which reinforces the coverings at the bent portions with strips of profiled plastic material provided with rounded edges and embracing the bent portions in frame-like fashion.

In this way the covering is provided with an almost rigid frame which is capable of affording a sufficient amount of stability to the covering when it is used, but which does not interfere with the necessary flexibility of the covering sheets when documents or identity cards etc. are introduced into or withdrawn from the covering.

According to Fig. 1 the covering 4 of plastic material is closed up at two side edges, viz. at one of its long sides and at one of its short sides, and reinforced along the edges of the closed up sides by a continuous profiled reinforcing strip extending from the upper end of the edge on the left side to the end of the lower edge on the right side, whereby the fastening of the reinforcing strip 1, 2 to the covering 4 is again effected by means of heat-sealing or bonding. Fig. 2 shows how the strip 1, 2 is secured to a closed end portion of the covering 4. Here again, the transversely extending portion 2 should preferably be thicker than the two lateral legs 1. The material from which the reinforcing strip is produced should be of greater strength and stability than the material from which the covering is manufactured, so that the covering is protected particularly at the U-shaped edge or closed end portions, which are most exposed to stresses against undesired bending or deformation.

The reinforcing strip should preferably consist of one continuous piece of material, whereby it makes no difference if the covering is closed up at two sides, as illustrated in Fig. 1, or at three sides, as shown in Fig. 3 for the covering of an identity card.

Important is also that the reinforcing frame 1, 2 is properly rounded off at the corners 6 (see Figs. 1 and 3), as these rounded off corners not only considerably augment the stability and the capacity of resistance of the endangered corner locations, but also prevent injuries of the hands and of the pockets, which until now used were frequently needed to enclose identity cards etc. in the covering.

When coverings are closed up at three sides, as shown in Fig. 3, the thicker transversely extending portion 2 of the reinforcing strip prevents tearing of the covering at the opening through which the identity card is pushed into or withdrawn from the covering, and which for that reason is most exposed to stresses. In known coverings this lack of resistance of the opening to wear is a serious drawback, as tearing of the covering at the opening makes the entire covering unfit for use.

It may further be mentioned that the reinforcing strip 1 must not necessarily consist of one continuous piece of material, but may be composed of a plurality of parts which then, at the corners 6, are tightly joined together and rounded off, as shown in Fig. 3.

The article of invention may also be used with advantage for the formation of a framework for all kinds of containers used for the packing therein of light articles, such as cosmetic articles, delicatessen, groceries etc. For this purpose the thicker cross-piece portion 2 of the strip may be provided with two or a plurality of pairs of legs or flanges projecting from the thicker portion 2 and consisting of either rigid or flexible material. The walls of the container, consisting of transparent or non-transparent plastic material, are tightly secured in the gaps between the pairs of flanges and augment in this way the stability, lifetime and filling capacity of boxes of this kind as compared with containers heretofore known.

As the legs or flanges 1 may be flexibly or deformably connected with the portion 2 it is possible to heat-seal or bond them in simple and practical manner to the U-shaped walls or partitions of coverings etc. It can thus be seen that there has been provided according to the invention means for reinforcing and supporting the U-shaped edge of a covering made of folded over plastic sheet material which has a pliable closed end portion and pliable side portions extending therefrom and which is adapted to retain records, loose leaf papers and like objects; comprising a strip of resilient and plastic material U-shaped in cross-section and having a cross-piece and spaced apart, substantially parallel legs projecting from said cross-piece, said legs of said strip extending a predetermined distance on the outer surfaces of said side portions of said covering and being attached thereto, whereby said side portions are spaced from each other in accordance with the spaced apart legs of said strip, said cross-piece having an inner surface abutting against the corresponding closed end portion of said U-shaped edge and being of a thickness at least twice the thickness of each leg, whereby the filling capacity of said covering will be completely maintained, while its U-shaped edge is reinforced.

Various changes and modifications may be made without departing from the spirit and scope of the present invention and it is intended that such obvious changes and modifications be embraced by the annexed claim.

What I claim as new and desire to secure by Letters Patent of the United States is:

Means for reinforcing and supporting the U-shaped edge of a covering made of folded over plastic sheet material which has a pliable closed end portion and spaced apart pliable side portions extending therefrom and which is adapted to retain records, loose leaf papers and like objects; comprising a strip of resilient and plastic material U-shaped in cross-section and having a cross-piece and spaced apart, substantially parallel legs projecting from said cross-piece, said legs of said strip extending a predetermined distance on the outer surfaces of said side spaced apart portions of said covering and being attached thereto, said side portions remaining unaltered and spaced from each other and being positioned directly contiguous to said spaced apart legs of said strip, so that the folded over U-shaped edge of said covering is maintained in its original unconstricted condition, said cross-piece having an inner surface abutting against the corresponding closed end portion of said U-shaped edge and being of a thickness at least twice the thickness of each leg, whereby the filling capacity of said covering will be completely maintained, while its U-shaped edge is reinforced.

References Cited in the file of this patent

UNITED STATES PATENTS

| 1,818,404 | Kaufman | Aug. 11, 1931 |
| 1,841,199 | Nolte | Jan. 12, 1932 |
| 2,146,308 | Maxfield | Feb. 7, 1939 |
| 2,388,297 | Slaughter | Nov. 6, 1945 |
| 2,606,352 | Wende | Aug. 12, 1952 |

FOREIGN PATENTS

| 560,251 | Great Britain | Mar. 27, 1944 |